US012198158B2

(12) United States Patent
Kumar et al.

(10) Patent No.: US 12,198,158 B2
(45) Date of Patent: Jan. 14, 2025

(54) METHODS AND SYSTEMS FOR TRACKING ECO-FRIENDLY FINANCIAL ACTIVITIES

(71) Applicant: MASTERCARD INTERNATIONAL INCORPORATED, Purchase, NY (US)

(72) Inventors: Amit Kumar, Uttar Pradesh (IN); Akshit Kapoor, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 229 days.

(21) Appl. No.: 16/910,723

(22) Filed: Jun. 24, 2020

(65) Prior Publication Data
US 2021/0056581 A1 Feb. 25, 2021

(30) Foreign Application Priority Data
Aug. 21, 2019 (SG) .......................... 10201907709W

(51) Int. Cl.
*G06Q 30/02* (2023.01)
*G06F 16/23* (2019.01)
(Continued)

(52) U.S. Cl.
CPC ..... *G06Q 30/0236* (2013.01); *G06F 16/2379* (2019.01); *G06Q 20/1085* (2013.01);
(Continued)

(58) Field of Classification Search
CPC ........... G06Q 30/0236; G06Q 20/1085; G06Q 20/127; G06Q 20/204; G06Q 20/341;
(Continued)

(56) References Cited

U.S. PATENT DOCUMENTS

| 8,732,021 B2 * | 5/2014 | Segal .................... G06Q 20/204 |
| | | 705/16 |
| 2009/0157512 A1 * | 6/2009 | King .................... G06Q 20/209 |
| | | 705/14.27 |

(Continued)

FOREIGN PATENT DOCUMENTS

WO WO-2013175320 A2 * 11/2013 ............. G06Q 10/04

OTHER PUBLICATIONS

Huber et al., The effect of incentives on sustainable behavior: evidence from a field experiment, Dec. 11, 2016, ELSEVIER, https://doi.org/10.1016/j.labeco.2016.11.012 (Year: 2016).*

(Continued)

*Primary Examiner* — Dipen M Patel
(74) *Attorney, Agent, or Firm* — Barta Jones, PLLC

(57) ABSTRACT

Systems and methods for tracking of eco-friendly activities performed by a user in finance related actions and rewarding the user for performing the eco-friendly activities. The method includes receiving a transaction file related to the financial transaction performed by the user who has enrolled for a green-score reward service. The green-score reward service is hosted by a server system to encourage the eco-friendly activity performed by the user. The method further includes determining whether the financial transaction comprises at least one attribute from a plurality of attributes which corresponds to the eco-friendly activity. The at least one attribute is determined based on a presence of one or more green bits in the transaction file related to the financial transaction performed by the user. Upon determination, the method further includes updating a green-score in a user profile associated with the user enrolled for the green-score reward service.

18 Claims, 11 Drawing Sheets

(51) Int. Cl.
| | |
|---|---|
| *G06Q 20/10* | (2012.01) |
| *G06Q 20/12* | (2012.01) |
| *G06Q 20/20* | (2012.01) |
| *G06Q 20/34* | (2012.01) |
| *G06Q 30/018* | (2023.01) |
| *G06Q 30/0207* | (2023.01) |
| *G06Q 30/0238* | (2023.01) |
| *G06Q 40/02* | (2023.01) |
| *G06Q 50/06* | (2012.01) |

(52) U.S. Cl.
CPC ......... *G06Q 20/127* (2013.01); *G06Q 20/204* (2013.01); *G06Q 20/341* (2013.01); *G06Q 20/352* (2013.01); *G06Q 30/018* (2013.01); *G06Q 30/0213* (2013.01); *G06Q 30/0222* (2013.01); *G06Q 30/0238* (2013.01); *G06Q 30/0239* (2013.01); *G06Q 40/02* (2013.01); *G06Q 50/06* (2013.01)

(58) Field of Classification Search
CPC ............... G06Q 20/352; G06Q 30/018; G06Q 30/0213; G06Q 30/0222; G06Q 30/0238; G06Q 30/0239; G06Q 40/02; G06Q 50/06; G06Q 20/108; G06Q 20/405; G06F 16/2379
See application file for complete search history.

(56) References Cited

U.S. PATENT DOCUMENTS

| | | | | | |
|---|---|---|---|---|---|
| 2009/0159707 | A1* | 6/2009 | Mullen | .............. | G06K 19/0704 235/493 |
| 2009/0252318 | A1* | 10/2009 | Smith | ................. | H04M 3/5238 379/265.1 |
| 2010/0125522 | A1* | 5/2010 | Thomas | ........... | G06Q 20/40145 705/44 |
| 2011/0015981 | A1* | 1/2011 | Subramanian | ..... | G06Q 30/0601 715/810 |
| 2011/0082733 | A1* | 4/2011 | Goldman | ............... | G06Q 40/02 705/14.17 |
| 2011/0137716 | A1* | 6/2011 | Reuthe | ................... | G06Q 20/04 705/14.17 |
| 2012/0191525 | A1* | 7/2012 | Singh | ..................... | G06Q 30/02 705/14.27 |
| 2014/0122272 | A1* | 5/2014 | Arzumanyan | ......... | G06Q 20/20 705/21 |
| 2015/0170186 | A1* | 6/2015 | Moreira Neto | .... | G06Q 30/0226 705/14.3 |
| 2016/0294572 | A1* | 10/2016 | Shadid | .............. | G07C 9/00182 |
| 2017/0186007 | A1* | 6/2017 | Lam | .................. | G06Q 20/4018 |
| 2019/0372345 | A1* | 12/2019 | Bain | ...................... | H02J 3/381 |
| 2020/0082427 | A1* | 3/2020 | Gleeson | ............. | G06Q 30/0226 |

OTHER PUBLICATIONS

Gift Cards Arthur Blank & Co. Receives "Boston Green Business Award", Apr. 26, 2007, Retail It Insights, https://www.retailitinsights.com/doc/gift-cards-arthur-blank-co-receives-boston-gr-0001 (Year: 2007).*

John B. Frank, GreenSense—Go Green on our Dime, Oct. 9, 2008, ePayments Blog, https://epaymentsblog.blogspot.com/2008/10/greensense-go-green-on-our-dime.html (Year: 2008).*

Ray Birch, CU's goal for green account bring in 1000 new members by the end of year, May 26, 2008, Credit Union Journal, New York, vol. 12, Iss. 21, p. 16 (Year: 2008).*

* cited by examiner

METHODS AND SYSTEMS FOR TRACKING ECO-FRIENDLY FINANCIAL ACTIVITIES

CROSS REFERENCE TO RELATED APPLICATION

This application claims the benefit of priority of Singapore Patent Application No. 10201907709 W, filed Aug. 21, 2019, entitled "Methods and Systems for Tracking Eco-Friendly Financial Activities", the entirety of which is incorporated herein by reference.

TECHNICAL FIELD

The present disclosure relates to global environment protection related methods and systems and, more particularly to, methods and systems for tracking and rewarding for eco-friendly activities performed by the user during finance related decisions or transactions.

BACKGROUND

The development of the human race has come with a heavy cost of depletion of natural resources and environment. As the population is increasing, the consumption of the natural resources and the degradation of the environment has also increased raising the risk of a resource-deprived future. Therefore, it is very important to utilize and conserve the resources judiciously. In recent times, many users are becoming aware of their contribution to eco-friendly measures. Multiple initiatives have been taken in encouraging the users for eco-friendly practices such as providing green scores to the users who are opting for activities such as recycling, reusing, saving water, reducing food wastage, public transportation, carpooling and so on.

During financial transactions or any finance related actions, user may perform an eco-friendly activity such as opting for e-bill or opting out for customer copy. However, these eco-friendly actions of users are going un-noticed and unrecognized due to lack of monitoring or accounting of such finance related activities. Hence, there exists a need for technological solutions to encourage environment-friendly behavior of the user while performing a finance-related action.

SUMMARY

Various embodiments of the present disclosure provide systems, and methods, for tracking and rewarding an eco-friendly activity performed by a user during a financial transaction or a finance related action.

In an embodiment, a method is disclosed for tracking eco-friendly activities performed by a user during financial transactions. The method includes receiving a transaction file related to the financial transaction performed by the user who has enrolled for a green-score reward service. The green-score reward service is hosted by a server system to encourage the eco-friendly activity performed by the user. The method further includes determining whether the financial transaction comprises at least one attribute from a plurality of attributes which corresponds to the eco-friendly activity. The at least one attribute is determined based on a presence of one or more green bits in the transaction file related to the financial transaction performed by the user. Upon determination, the method further includes updating a green-score in a user profile associated with the user enrolled for the green-score reward service.

In another embodiment, a server system associated with a payment network is disclosed. The server system includes a memory comprising stored instructions and at least one processor configured to execute the stored instructions to cause the server system to perform a method. The method includes receiving a transaction file related to the financial transaction performed by the user who has enrolled for a green-score reward service. The green-score reward service is hosted by a server system to encourage the eco-friendly activity performed by the user. The method further includes determining whether the financial transaction comprises at least one attribute from a plurality of attributes which corresponds to the eco-friendly activity. The at least one attribute is determined based on a presence of one or more green bit in a transaction file related to the financial transaction performed by the user. Upon determination, the method further includes updating a green-score in a user profile associated with the user enrolled for the green-score reward service.

In yet another embodiment, another method is disclosed for tracking eco-friendly activities performed by a user during financial transactions. The method includes receiving a response from the user, during the financial transaction, on a notification message for taking a paper printed transaction receipt of the payment transaction. The method further includes determining whether the response corresponds to declining the paper printed transaction receipt. The declination by the user for the paper printed transaction receipt corresponds to the eco-friendly activity. Upon successful determination of the declination, the method further includes setting a flag of a green bit to one in a transaction file related to the financial transaction performed by the user. The method further includes sending the transaction file to a server system managing a green-score reward service. The server system is configured to verify a subscription of the user of for the green-score reward service. The server system is further configured to determine the flag of the green bit set to one, based on a communication with an issuer server associated with a payment account of the user, and update a green score of the user.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
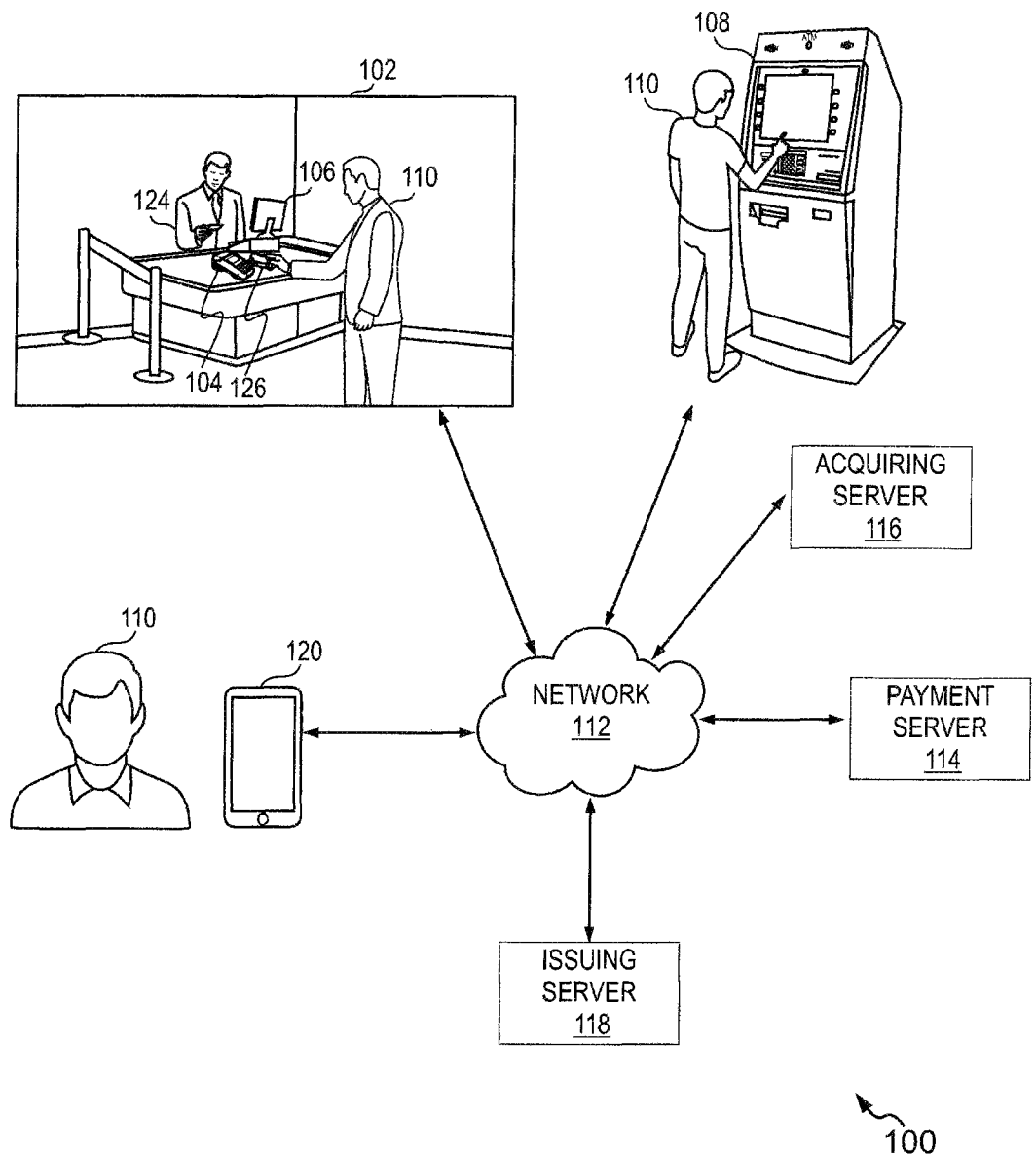
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuing server" used throughout the description refers to a server that holds a financial account that is used to fund the financial transaction (interchangeably referred to as "card payment transaction") of a cardholder. Further, the term "acquiring server" used throughout the description refers to a server that holds a financial account of a merchant or any entity which receives the fund from the issuing server. Examples of the issuing server and the acquiring server include, but are not limited to a bank, electronic payment portal such as PayPal®, and a virtual money payment portal. The financial accounts in each of the issuing server and the acquiring server may be associated with an entity such as an individual person, a family, a commercial entity, a company, a corporation, a governmental entity, a non-profit organization and the like. In some scenarios, the financial account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card includes, but are not limited to, debit cards, credit cards, prepaid cards, digital wallet, virtual payment numbers, virtual card numbers, forex card, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

The term "payment server", used throughout the description, refers to a network or collection of systems used for transfer of funds through use of cash-substitutes. Payment servers may use a variety of different protocols and procedures in order to process the transfer of money for various types of transactions. Transactions that may be performed via a payment server may include product or service purchases, credit purchases, debit transactions, fund transfers, account withdrawals, etc. Payment servers may be configured to perform transactions via cash-substitutes, which may include payment cards, letters of credit, checks, financial accounts, etc. Examples of networks or systems configured to perform as payment servers include those operated by Mastercard®, VISA®, Discover®, American Express®, etc.

The term "eco-friendly (also referred to as, environment-friendly, eco-friendly action, eco-friendly activity, or eco-friendly action) refers to activities, decisions, goods, services and laws that cause reduced or no harm to the environment.

The term "green" is used to describe the activity that involves preserving the environment from wastage and pollution of its resources. Further, the term "green score" is a graded labelling process or system for indicating a level of eco-friendliness of a person, an activity, a product, a business or a service.

Overview

Various example embodiments of the present disclosure provide methods and systems for tracking an eco-friendly activity of a user while performing a finance related transaction. More specifically, techniques disclosed herein enable tracking of an eco-friendly activity performed by a user while making a payment transaction or while taking a finance related decision and further rewarding the user for the eco-friendly activity by giving a green score associated with the user. The green score is generated, maintained and updated based on one or more green bits associated with each financial transaction made by the user or any finance related decision taken by the user which involves eco-friendly initiative such as declining a customer copy during a payment at a Point of Sale (POS) terminal or opting for an e-bill or an e-statement. The merchant terminal can be a POS terminal, or an e-commerce website hosted by the merchant. The user can perform the financial transaction at an automated teller machine (ATM).

In an example embodiment, a user gets enrolled with a server system for availing a green-score reward service for the payment transactions performed by the user. The registration of the user includes receiving details such as username, a registered mail-id or a registered mobile number, and an account number associated with a user account at the issuing bank. In an embodiment, the server system is configured to process a green bit present in a transaction file sent to the server system by a merchant terminal, where the green bit is added in the transaction file when any of the user's activity relates to an eco-friendly activity. An example of the transaction file includes a payment transaction request comprising data related to the payment transaction along with the green bit in order to track whether the payment transaction is an eco-friendly payment transaction. Another example of the transaction file be can be a clearance file sent by the merchant terminal in batches, for example, at the end of the day or at fixed time intervals. Another example of the transaction file can be a file sent after the payment transaction request is sent to the payment server and the payment transaction is approved. For instance, once the payment transaction is completed (i.e. the payment transaction request is sent to the payment server, and is authorized by issuer server, and the merchant terminal has received confirmation of the payment), and the customer does not require a printed receipt of the completed transaction, the merchant terminal such as the POS can send a separate transaction file comprising the green bit, where the green bit represent the eco-friendly activity of the user.

In an embodiment, the user performs a financial transaction at a merchant terminal or other terminals for example, but not limiting to, a POS terminal and an ATM. During the payment transaction, an option is showed on a display screen of the POS terminal or the ATM that asks whether the user wants a printed receipt of the transaction. If the user declines the option for taking the printed receipt, then it is considered as an eco-friendly activity performed by the user by saving the paper. The merchant terminal generates a transaction file related to the financial transaction and updates a green bit by setting the green bit to '1' from a default state of '0' in the transaction file based on the environment-friendly action of the user. The transaction file including the updated green bit is sent to an acquiring server associated with the terminal and the acquiring server sends the transaction file to the payment server. The payment server sends the transaction file to the issuing server for verification. The issuing server verifies the transaction file and sends an approval or declination to the payment server. Upon receiving the approval from the issuing server, the payment server determines whether the transaction file comprises at least one attribute from a plurality of attributes based on a value of the green bit equals to "1". The attributes are defined corresponding to eco-friendly activities for example, but not limited to, whether the user has declined the option for taking printed receipt while withdrawing money at ATM. In an alternate embodiment, upon receiving approval from the issuing server, the payment server, instead of the merchant terminal, can also update the green bit by setting the green bit to '1' from a default state of '0' in the transaction file received from the merchant via the acquiring server based on determination that the financial transaction performed by the user includes an eco-friendly activity.

The green bit is added in the transaction file for tracking the eco-friendly activities performed by the user during any financial transaction or any finance related decision. The green bit is added in at least one data element field in the transaction file's application data field. Upon updating the green bit, the payment server further updates a green score associated to a user profile created for the user when the user has already enrolled for the green-score reward service. The green score is maintained as a counter which increments by a predetermined number whenever a set green bit is received in any financial transaction or the user makes any finance related decision. Additionally, the green score is also incremented by the predetermined number if the user is involved in an eco-friendly activity for example, but not limited to, the user decides to select electronic account statements (e-account statements) which means no printed account statements. The user may also get rewards on monthly or yearly basis corresponding to his/her green score. The rewards may include cashable credit points, discount offers, or an acknowledgment certificate to show respect for the user's participation. The user may also share the acknowledgement certificate in user's social circle via chat groups or user's social media accounts for encouraging others for eco-friendly initiative, as well as receiving words of appreciation from other people. These details (e.g., green score of the user) may also be presented to government bodies for environment planning or the data can also be used by advisory for building up brand name of the company which is tracking and acknowledging the user's contribution in green environment in payment industry.

Therefore, the above explained process of incrementing green bit along with incrementing green score associated with the user helps in tracking and acknowledging eco-friendly activities of the user during payment transactions or while making finance related decisions.

FIG. 1 illustrates an exemplary representation of an environment 100, in which at least some example embodiments of the present disclosure can be implemented. The environment 100 is exemplarily shown including a merchant facility 102 (also referred to herein as 'a merchant 102 or 'a merchant terminal 102'), an ATM 108, a user device 120 associated with a cardholder 110 (also referred to herein as 'a user 110'), a network 112, a payment server 114, an issuing server 118, and an acquiring server 116. The merchant facility 102 is equipped with a POS terminal 104, and a merchant interface device 106. Examples of the merchant facility 102 may include any retail establishments such as, restaurant, supermarket or business establishments such as, government and/or private agencies, toll gates, parking lot or any such place equipped with POS terminals, such as the POS terminal 104 or commercial website establishments such as, restaurant, supermarket or business establishments such as, government and/or private agencies, toll gates, parking lot or any such place where customers visit for performing financial transaction in exchange for any goods and/or services or any transaction that requires financial transaction between customers and a merchant. In various embodiments, the merchant interface device 106 can be a telephone or a computer system operated by an agent 124 for performing payment transactions on behalf of a customer, for example, a cardholder 110 using a payment card 126. Another example of the merchant interface device 106 can be the ATM 108 where the cardholder 110 performs basic financial transactions such as cash withdrawals, deposits, transfer funds, or obtaining account information, at any time and without the aid of a branch representative or teller.

The user device 120 may be a portable user device. Examples of the portable user device 120 include, but are not limited to, a smart phone, a personal digital assistant (PDA), and a laptop, among others. In some embodiments, the user device 120 may be a non-portable user device. Examples of the non-portable user device 120 include a personal computer (PC) and a kiosk, among others. The user device 120 may be a device that the user (e.g., the cardholder 110) operates to browse a website and to perform a financial transaction.

The payment server 114 facilitates payment transactions by the transfer of information between the acquiring server 116 and the issuing server 118 via the network 112. The issuing server 118 is associated with a financial institution normally called as an "issuer bank" or "issuing bank" or simply "issuer" or simply "bank", in which the cardholder 110 may have an issuer account, which issues one or more payment cards, such as a credit card or a debit card. The payment cards are linked to an issuer account associated with a unique payment account number of the cardholder 110. The cardholder 110 can use any of the payment cards to tender payment for the purchase. The issuer bank is responsible for determining whether a customer's issuer account is in good standing and whether the purchase is covered by the customer's available credit line or account balance. Based on these determinations, the payment transaction associated with the payment transaction request is approved or declined. The payment server 114 further facilitates tracking and rewarding eco-friendly activities performed by the cardholder 110 during financial transactions for the cardholders 110 who have registered for green-score reward service.

The acquiring server 116 is associated with a financial institution normally called as a "merchant bank" or the "acquiring bank" or "acquirer bank" or simply "acquirer", in which the merchant 102 may have a merchant account. Using the network 112, the acquiring server 116 will communicate with the issuing server 118 to determine whether the cardholder's account is in good standing and whether the transaction amount of the purchase is covered by the cardholder's available account balance. Based on these determinations, authorization of the transaction is declined or accepted. When the authorization is accepted, the available balance of cardholder's account is decreased.

The payment card 126 is issued by the issuing server 118 in association with the payment server 114. The merchant 102, the user device 120, the payment server 114, the issuing server 118, and the acquiring server 116 are communicatively coupled with each other via the network 112.

In an example application scenario, the cardholder 110 is interested in availing the green-score reward service for getting rewards in exchange of eco-friendly activities performed by the cardholder 110 during financial transactions or other finance related decisions. The green-score reward service can be provided by a server system (for example, but not limiting to, the payment server 114). In order to avail the green-score reward service the cardholder 110 will register on a service portal (not shown) managed by the payment server 114 or any other server such as the issuing server 118. The cardholder 110 can register on the service portal by accessing a website hosted by the payment server 114. During the registration process, the cardholder 110 provides details such as name of the cardholder, permanent address, email-id, identity proof details, registered account number etc., on the service portal. The payment server 114 sends the shared details of the cardholder 110 to the issuing server 118 for verification. The issuing server 118 validates the details shared by the cardholder 110 based on registered information of the cardholder 110 at the issuing server 118. The issuing server 118 sends notification stating successful validation of the details shared by the cardholder 110. Upon receiving the notification from the issuing server 118, the payment server 114 renders a user interface on the user device 120 for creation of login credentials including UserID and password for future access at the service portal by the cardholder 110.

In another example embodiment, the cardholder 110 performs a payment transaction at the merchant terminal 102 (for example, at the POS terminal 104) or at the ATM 108. During or after the payment transaction, the cardholder 110 may be asked whether the cardholder 110 wants a printed receipt of the payment transaction (for example, at POS terminal 104 whether the cardholder 110 wants a customer copy or at the ATM 108 whether the cardholder 110 wants a printed receipt). In an alternate or additional embodiment, the cardholder 110 can get a notification on the user device 120 asking whether the cardholder 110 is interested in taking the printed receipt of the payment transaction. The cardholder 110 can tap or swipe the notification in a pre-defined manner which indicates that the cardholder 110 does not want the printed receipt, or the cardholder 110 sends a message writing "green" as a response to the notification indicating that the cardholder 110 does not want the printed receipt. In an example embodiment, if the cardholder is not taking the printed receipt then the cardholder 110 may need to swipe the payment card 126 or tap the payment card 126 again in order to provide confirmation of the choice of not taking the printed receipt and the swiping or tapping of the payment card second time indicates that the cardholder 110 is instructing that the green score shall be updated based on the eco-friendly activity performed by the cardholder 110 (i.e., declining printed receipt). If the cardholder 110 agrees for not taking the printed receipt of the payment transaction, the merchant terminal 102 increments a green bit (e.g., sets the flag of green bit) by one in a transaction file associated with the financial transaction. In some embodiments, once the payment transaction is completed, user's eco-friendly activity related to the payment transaction is marked and stored locally or elsewhere, and corresponding information is accessible to the merchant terminal 102. For instance, the merchant terminal 102 has access to the information that a user 'X' has performed a payment transaction today that involved an eco-friendly activity. In one of these embodiments, the transaction file comprising the green bit is sent immediately after the payment transaction request is processed or completed. In this embodiment, the transaction file comprises a field indicating the green bit, along with the payment account details of the user. In another embodiment, transaction file can be sent after a pre-defined time period of completion of the payment transaction. In yet another embodiment, the transaction file may be a clearance file that is normally send to settle transactions performed by the merchant terminal at pre-determined time intervals. In this embodiment, the green bit is included in the clearance file.

In another embodiment, the transaction file comprising the green bit is sent along with the payment transaction request. In this embodiment, whether "user wants a receipt of the transaction" is asked even before the transaction request is sent by the merchant terminal 102 to the acquirer server 116. Accordingly, the merchant terminal 102 has information whether the forthcoming payment transaction is eco-friendly or not. If the user has opted to not accept the printed customer copy, the green bit is included in the transaction file and is sent along with the payment transaction request to the payment server 114 via the acquirer server 116. For example, the merchant terminal 102 sends the payment transaction comprising the transaction file having green bit to the acquiring server 116. The acquiring server 116 sends the payment transaction comprising the transaction file to the payment server 114. Upon receiving the payment transaction, the payment server 114 sends the payment transaction to the issuing server 118 for verification. The issuing server 118 authenticates and approves the payment transaction based on checking its database having all the information registered for each customer and checking an outstanding balance of the account of the cardholder 110. The issuing server 118 sends an approval to the payment server 114 upon successfully verifying the payment transaction.

Upon receiving approval from the issuing server 118, the payment server 114 determines whether the green bit is set in the transaction file. Upon successful determination, the payment server 114 updates a green score associated to a user profile created for the cardholder 110 when the cardholder 110 has enrolled for the green-score reward service. The green score is maintained as a counter which increments whenever a flag of green bit is set (e.g., green bit is '1') in any financial transaction or when the cardholder 110 made any finance related decision which involves an eco-friendly activity for example, but not limited to, the cardholder 110 decided to select electronic account statements (e-account statements) which means no printed account statements. The cardholder 110 may also get rewards on a monthly or yearly basis based on his/her green score and further these details may also be presented to government bodies for environment planning or the data can also be used by advisory for building up brand name of the company which is tracking and acknowledging the user's contribution in green environment in payment industry.

In an alternate embodiment, the payment server 114 may also update the green bit in the transaction file post receiving approval from the issuing server 118 and further increments the green score of the cardholder 110. In an example embodiment, the payment transaction is sent to the acquiring server 116 associated with the merchant 102 and the acquiring server 116 sends a transaction file including a green bit to the payment server 114. The payment server 114 sends the payment transaction to the issuing server 118 for verification. The issuing server 18 verifies the payment transaction and sends an approval or declination to the payment server 114. Upon receiving the approval from the issuing server 118, the payment server 114 determines whether the payment transaction comprises at least one attribute from a plurality of attributes which comprises an eco-friendly activity for example, but not limited to, whether the cardholder 110 has declined the option for taking printed receipt while withdrawing money at ATM 108 or has declined a customer copy at the POS terminal. Upon successful determination, the payment server 114 updates a green bit in the transaction file received from the merchant 102 via the acquiring server 116. The green bit is introduced in the transaction file for tracking the eco-friendly activities performed by the cardholder 110 during any financial transaction or any finance related decision. The green bit is present in at least one data element field in the transaction file's application data field. Upon updating the green bit, the payment server 114 further updates a green score associated to the user profile.

For each eco-friendly payment transaction, the green score is incremented based on status of the green bit and the updated green score is saved in a database. For example, the cardholder 110 performs a cash withdrawal at the ATM 108 and declines the option of taking the printed receipt of the cash withdrawal. In this example, the green bit for this payment transaction is set to 1, and subsequently the green score is also incremented by 1. Let's say the green score was 20 so after increment, the green score will be 21 and the updated green score will be saved in the database.

In another example, the cardholder 110 purchased an item at a shop and paid using the payment card 126 at the POS terminal 104. The cardholder 110 further declined the option of taking a customer copy of the payment transaction, therefore the green bit is incremented in the transaction file for the payment transaction. For example, if the green score of the cardholder 110 is 41, after the transaction at the POS terminal 104, the green score is incremented by 1, so now green score is 41+1=42, which gets updated and saved in the database. A default value of the green bit may be set to '0'. The green score corresponds to an incremental counter which increments every time a payment transaction includes the green bit which is set to '1' or a higher value. In an alternative or additional embodiment, the green score can be reset to zero after completion of a predetermined time cycle for example, but not limited to, the green score is reset once a year or once a month etc.

In another example embodiment, the green score may also be set to a default value for the cardholder 110 who already made finance related decisions which are eco-friendly and registered for the green-score reward service later. Therefore, based on the information from their account details they can be given a default green score which will later be incremented according to financial transactions and finance related decisions made by the cardholder 110. For example, when the cardholder 110 opts for the green-score reward service, and the cardholder 110 had already opted for an e-account statement or electronic bill, the cardholder 110 will be given a default predetermined number to the green score (termed as, "default green score"), for example, green score equivalent to 10. The green score will further be incremented based on future eco-friendly financial transactions or finance related decisions made the cardholder 110. The user may also get rewards on monthly or yearly basis corresponding to his/her green score. The rewards may include cashable credit points, discount offers, or an acknowledgment certificate to show respect for the user's participation. The user may also share the acknowledgement certificate in user's social circle via chat groups or user's social media accounts for encouraging others for eco-friendly initiative, as well as receiving words of appreciation from other people.

The plurality of attributes includes at least one of following eco-friendly activities: a) declining a request for taking print of a transaction receipt during the payment transaction at the ATM 108, b) declining a request for taking print of a customer copy during the payment transaction at the POS terminal 104, c) decrease in an electricity bill amount paid by the cardholder 110 consecutively for a threshold number of months, d) decrease in a fuel consumption of the cardholder 110 consecutively for a threshold number of months, e) opting for at least one of an electronic-bill, e-account statement, or an electronic-payment card statement, f) purchasing at least one product from a merchant registered as an eco-friendly merchant under the green-score reward service, and g) purchasing an eco-friendly product through e-commerce.

The plurality of attributes are checked by the payment server 114 by monitoring at least one of the payment transaction performed by the cardholder 110, the account statements of the cardholder 110, the preferences details of the cardholder 110 present in the account which includes choices preferred by the cardholder 110 such as e-account statements, electronic bills etc. The attributes such as "declining a request for taking print of a transaction receipt during the payment transaction at the ATM 108" or "declining a request for taking print of a customer copy during the payment transaction at the POS terminal 104", can be tracked by updating green bit in the transaction file.

Further the attributes such as "decrease in an electricity bill amount" of the cardholder 110 consecutively for a threshold number of months or "decrease in a fuel consumption" of the cardholder 110 consecutively for a threshold number of months, can be tracked by analyzing payment transactions involving payment of bills for a particular type of merchant such as electricity board or fuel station. Further, the attributes such as "opting for at least one of an electronic-bill", "e-account statement", or "an electronic-payment card statement", can be tracked by monitoring customer preferences present in the account details associated with the cardholder 110. Further, the attributes comprising purchasing at least one product from a merchant registered as an eco-friendly merchant under the green-score reward service, or purchasing an eco-friendly product through e-commerce, can be tracked by analyzing the payment transaction and checking the merchant name and type in the transaction file related to the payment transaction.

Figure 2A:
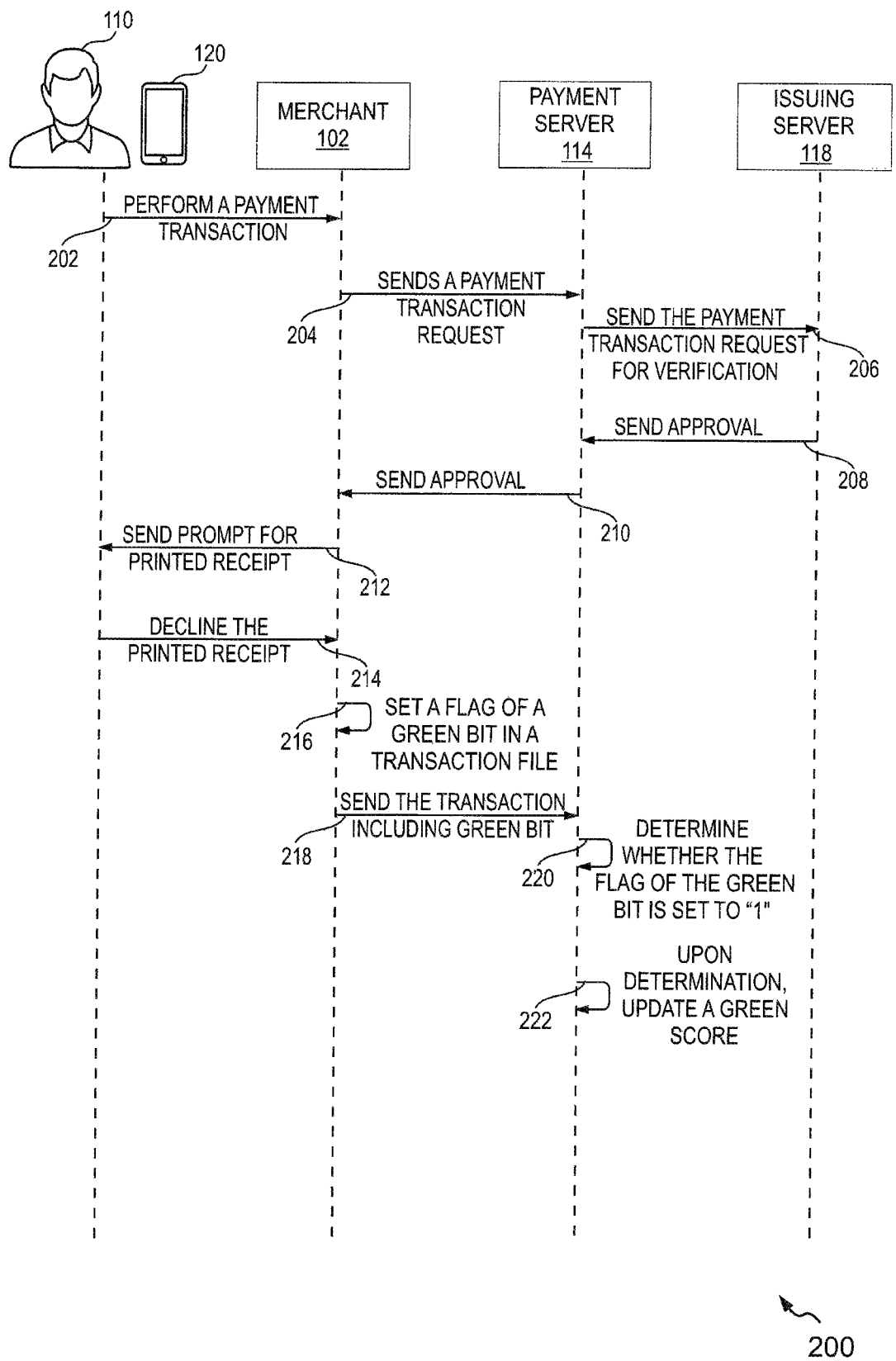
FIG. 2A illustrates a sequence flow diagram representing a method of tracking an eco-friendly activity related to a financial transaction, in accordance with an embodiment of the present disclosure.

FIG. 2A illustrates a sequence flow diagram representing a method 200 of tracking an eco-friendly activity of declining printed receipt while performing a transaction at a merchant, in accordance with an example embodiment.

At 202, the user 110 performs a payment transaction at the merchant 102 (for example paying a bill at POS terminal 104 deployed at a supermarket or withdrawing cash or account statement at ATM 108).

At 204, upon receiving the payment transaction, the merchant 102 sends a payment transaction request to the payment server 114 via the acquiring server 116. The payment transaction request includes details related to the payment transaction such as payment amount, payment card details of the cardholder 110, merchant details etc. At 206, the payment server 114 sends the payment transaction request to the issuing server 118 for verification. At 208, the issuing server 118 sends an approval to the payment server 114 based on successful verification of the payment transaction by checking its database having all the information registered for each customer. At 210, the payment server 114 sends the approval to the merchant 102.

At 212, upon receiving the approval, the merchant 102 renders a prompt, on its display screen, giving option to the user 110 for taking a printed receipt of the payment transaction (for example, a customer copy at the POS 104 or account statement or transaction copy at the ATM 108). At 214, the user 110 declines the option of taking the printed receipt of the payment transaction which is considered as an eco-friendly activity.

At 216, the POS 104 at the merchant 102 automatically sets a flag of a green bit to "1" in a transaction file related to the payment transaction to the payment server 114 based on the declination by the user for taking the customer copy. In an embodiment, the merchant 102 can also set a flag of a green bit to "1" manually. The flag of the green bit is set to "1" to indicate that the user 110 has declined the option of taking the customer copy of the payment transaction. At 218, the merchant 102 sends the transaction file to the payment server 114 via the acquiring server 116. The transaction file comprises the green bit with the flag set to "1", and other data related to the payment transaction such as account details of the user 110, type of payment, mode of payment, merchant details, type of merchant, message type indicator, etc. It shall be noted that the transaction file comprises a field indicating the green bit, along with the payment account details of the user. In another embodiment, transaction file can be sent after a pre-defined time period of completion of the payment transaction. In yet another embodiment, the transaction file may be a clearance file that is normally send to settle transactions performed by the merchant terminal at pre-determined time intervals. In this embodiment, the green bit is included in the clearance file. In an embodiment, the transaction file may include various fields such as header data fields, application data fields, cyclic redundancy check (CRC) data fields and the like. The transaction file is explained in detail in conjunction with FIG. 6. In another embodiment, the transaction file may be a clearance file that is normally send to settle transactions performed by the merchant terminal at pre-determined time intervals.

At 220, upon receiving the transaction file, the payment server 114 determines whether the flag of the green bit in the transaction file is set to the "1" in order to determine that the payment transaction is eco-friendly.

At 222, upon determination that the flag of the green bit is set to "1", the payment server 114 updates a green score associated with a user profile created for the user 110. The green score is maintained as a counter which increments whenever the flag of the green bit is set to "1" in any financial transaction or when the user 110 makes any finance related decision which involves an eco-friendly activity.

Figure 2B:
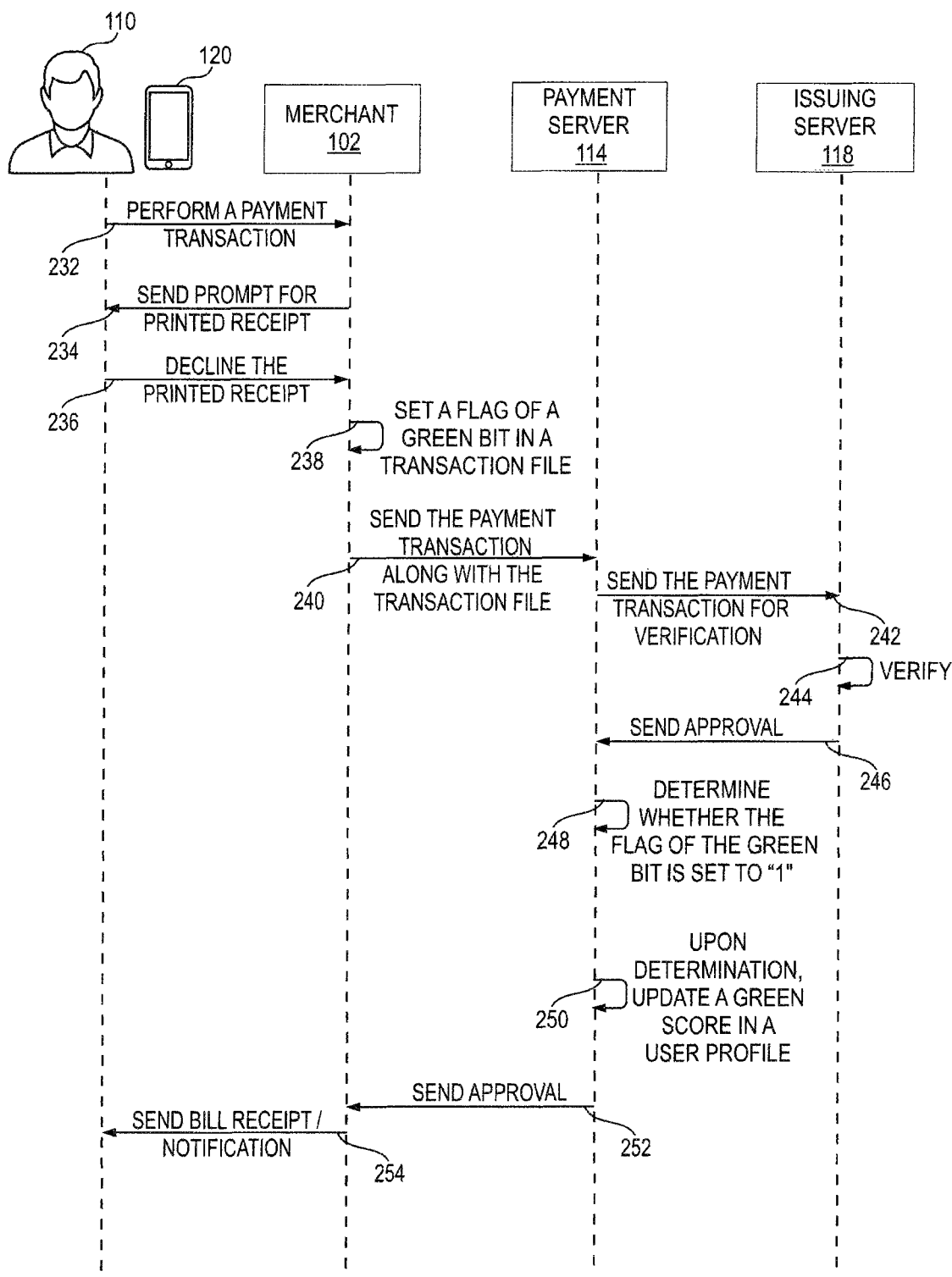
FIG. 2B illustrates a sequence flow diagram representing a method of tracking an eco-friendly activity related to a financial transaction, in accordance with another embodiment of the present disclosure.

FIG. 2B illustrates a sequence flow diagram representing another method 230 of tracking an eco-friendly activity of declining printed receipt while performing a transaction at a merchant, in accordance with an example embodiment.

At 232, the user 110 performs a payment transaction at the merchant 102 (for example paying a bill at POS terminal 104 deployed at a supermarket or withdrawing cash or account statement at ATM 108).

At 234, upon receiving the payment transaction, the merchant 102 renders a prompt, on its display screen, giving option to the user 110 for taking a printed receipt of the payment transaction (for example, a customer copy at the POS 104 or account statement copy at the ATM 108). At 236, the user 110 declines the option of taking the printed receipt of the payment transaction which is considered as an eco-friendly activity.

At 238, the merchant 102 sets a flag of a green bit to "1" in a transaction file related to the payment transaction to the payment server 114 based on the declination by the user for taking the customer copy. The flag of the green bit is set to "1" to indicate that the user 110 declined the option of taking the customer copy of the payment transaction. At 240, the merchant 102 sends payment transaction request comprising the transaction file to the payment server 114 via the acquiring server 116. The transaction file comprises the green bit with the flag set to "1", and other data related to the payment transaction such as type of payment, mode of payment, merchant details, type of merchant, message type indicator, etc.

At 242, the payment server 114 sends the payment transaction to the issuing server 118 for verification. At 244, the issuing server 118 verifies the payment transaction based on checking its database having all the information registered for each customer. At 246, upon successful verification, the issuing server 118 sends an approval to the payment server 114.

At 248, upon receiving the approval from the issuing server 118, the payment server 114 determines whether the flag of the green bit in the transaction file is set to the "1" in order to determine that the payment transaction is eco-friendly.

At 250, upon determination that the flag of the green bit is set to "1", the payment server 114 updates a green score associated with a user profile created for the user 110. The green score is maintained as a counter which increments whenever the flag of the green bit is set to "1" in any financial transaction or when the user 110 makes any finance related decision which involves an eco-friendly activity. However, if the issuing server 118 declines the payment transaction, then the payment server 114 sets the flag of the green bit to default binary value "0" and the green score is not incremented.

At 252, the payment server 114 sends approval to the merchant 102 via the acquiring server 116. At 254, the merchant 102 sends a bill receipt/notification to the user 110 indicating successful completion of the payment transaction. The bill receipt/notification can be at least one of a message or an email.

Figure 3:
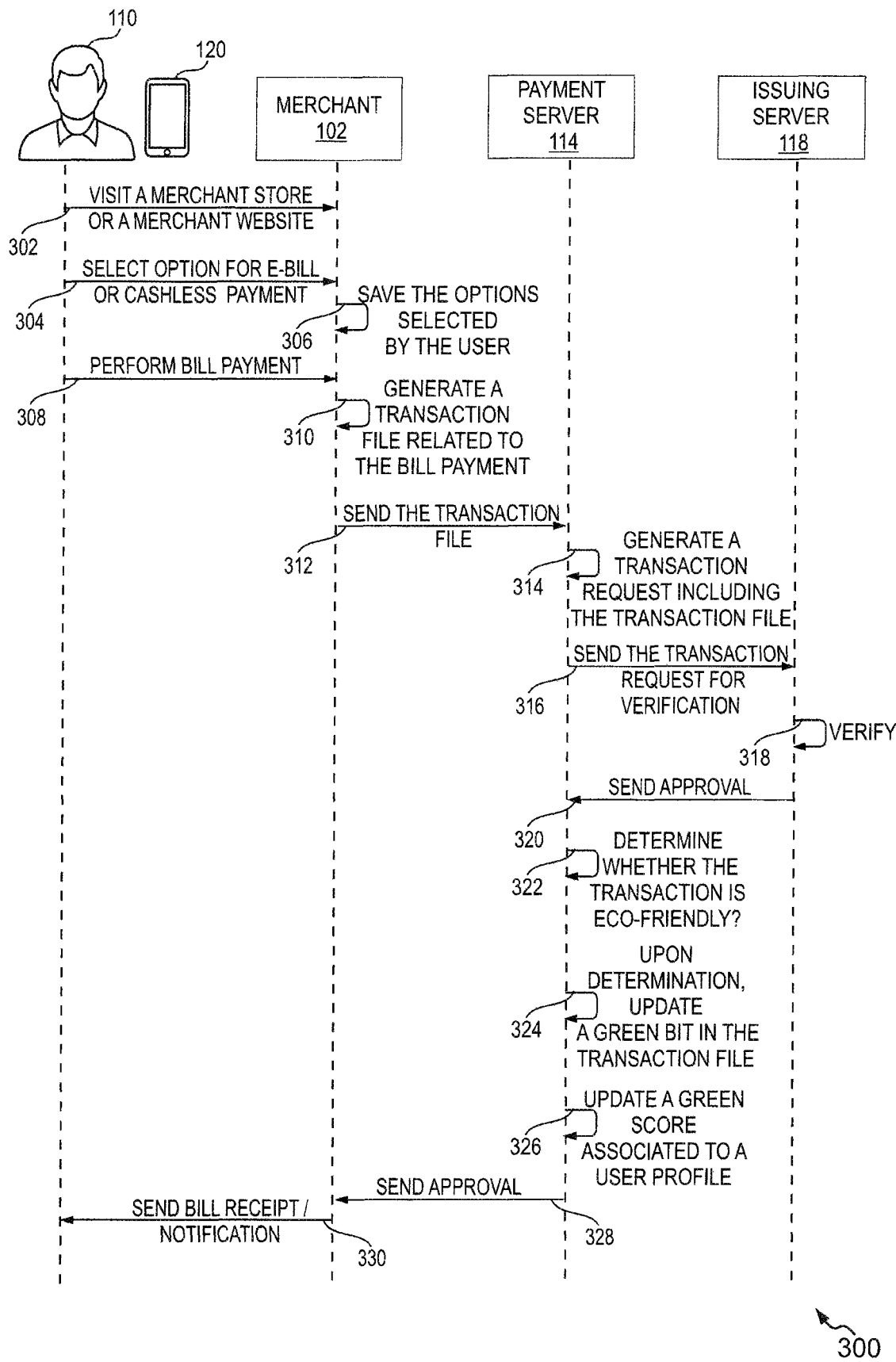
FIG. 3 illustrates a sequence flow diagram representing another method of tracking an eco-friendly activity of declining printed receipt while performing a transaction at a POS terminal, in accordance with an embodiment of the present disclosure.

FIG. 3 illustrates a sequence flow diagram representing a method 300 of tracking an eco-friendly choice/decision taken by the cardholder 110 related to financial activity, in accordance with another example embodiment.

At 302, the user 110 visits a merchant store or an online merchant website hosted by the merchant 102. At 304, the user 110 selects an option of receiving e-bill or an option of cashless bill payment. At 306, the merchant 102 saves the options selected by the user 110 for future reference. The selection of e-bill or online bill payment are considered as environment-friendly activities or actions.

At 308, the user 110 performs a bill payment using cashless payment options such as card-based payment at the merchant 102 or online bill payment etc.

At 310, upon receiving a request for the bill payment from the user 110, the merchant 102 generates a transaction file related to the bill payment. The transaction file includes multiple data fields including details related to the bill amount, mode of payment, user's choice of e-bill, user's card details, etc. The transaction file also includes a green bit.

At 312, the merchant 102 sends the generated transaction file to the payment server 114 via the acquiring server 116 (shown in the FIG. 1).

At 314, the payment server 114 generates a transaction request including the transaction file received from the merchant 102. At 316, the payment server 114 sends the transaction request to the issuing server 118 for verification. At 318, the issuing server 118 verifies the payment transaction based on checking its database having all the information registered for each customer (e.g., cardholders). At 320, upon successful verification, the issuing server 118 sends an approval to the payment server 114.

At 322, upon receiving the approval, the payment server 114 determines whether the transaction (i.e. the bill payment) is eco-friendly or not based on determining whether the details in the transaction file corresponds to at least one attribute from a plurality of attributes. Examples of the attributes include an eco-friendly activity for example, but not limited to, whether the user 110 has opted for e-bill, or cashless payments.

At 324, upon determination, the payment server 116 updates a green bit in the transaction file received from the merchant 102. The green bit is introduced in the transaction file for tracking the eco-friendly activities performed by the user 110 during any financial transaction or any finance related decision. The green bit is present in at least one data element field in the transaction file's application data field. The green bit may have a default binary value of '0', and when the green bit is updated, it is set to '1' in the transaction file.

At 326, the payment server 114 updates a green score associated with a user profile created for the user 110 based on the update of the green bit to "1" in the transaction file. The green score is maintained as a counter which increments whenever the flag of the green bit is set to "1" in any financial transaction or when the user 110 makes any finance related decision which involves an eco-friendly activity. However, if the issuing server 118 declines the payment transaction, then the payment server 114 sets the flag of the green bit to default binary value "0" and the green score is not incremented.

At 328, the payment server 114 sends approval to the merchant 102 via the acquiring server 116 (shown in the FIG. 1).

At 330, the merchant 102 sends a bill receipt/notification to the user 110 indicating successful completion of the payment transaction. The bill receipt/notification can be at least one of a message or an email.

Figure 4:
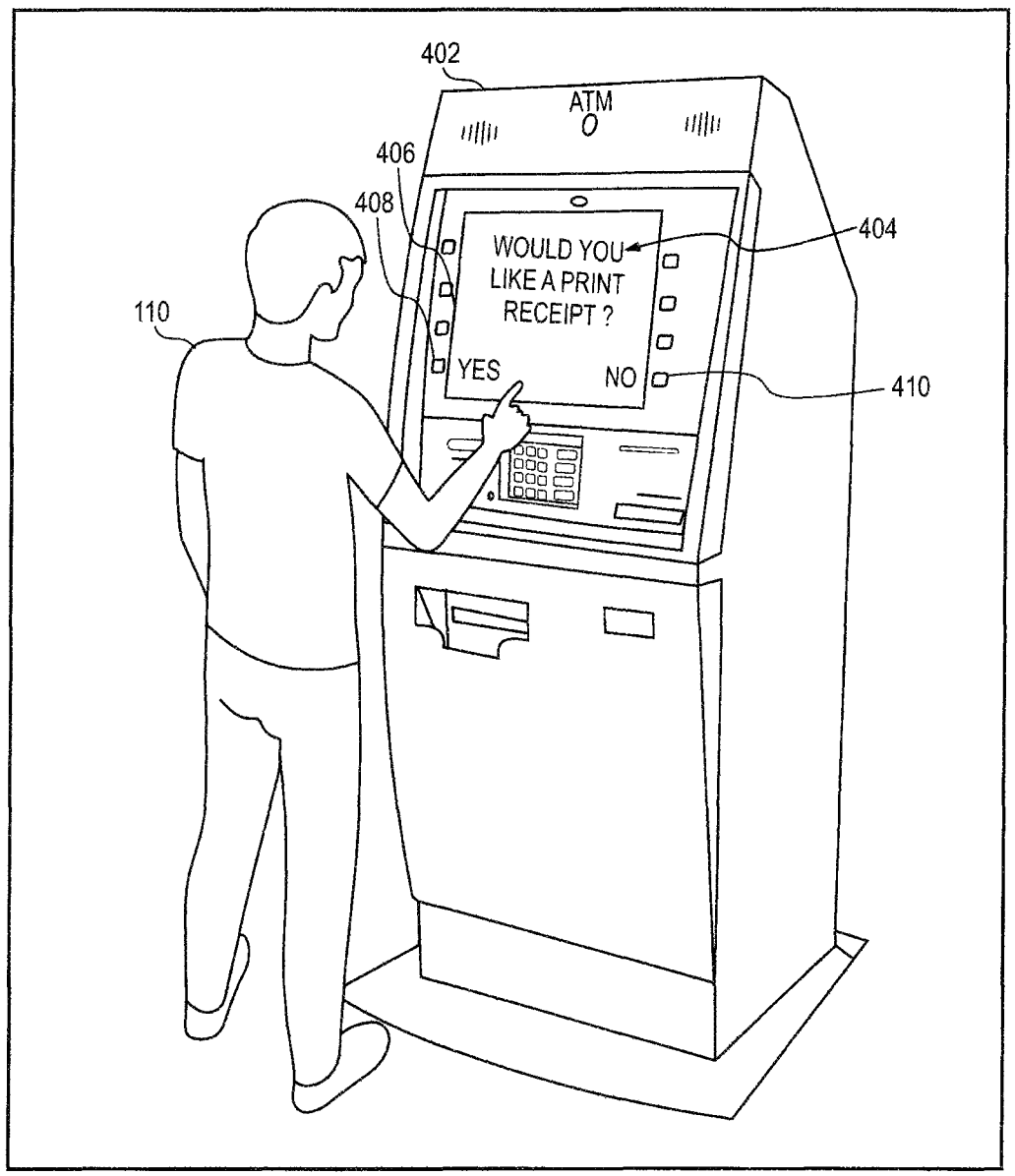
FIG. 4 illustrates an example representation of a user interface (UI) displayed to the cardholder on a display screen of an ATM, in accordance with an embodiment of the present disclosure.

FIG. 4 is an example representation of a user interface (UI) 400 displayed to the cardholder 110 on a display screen 406 of the ATM 402 (for example, the ATM 108 as shown in FIG. 1) configured to render selection inputs for opting or declining a printed receipt of a payment transaction performed by the cardholder 110 at the ATM 108. The display screen of the ATM 402 may or may not be a touchscreen.

As shown in the UI 400, a prompt 404 is rendered on the display screen 406 of the ATM 402 which displays a message "would you like a print receipt?" and further indicates input buttons (408 and 410) for opting a "YES" or "NO", respectively as response to the prompt. The input buttons (408 and 410) may also be rendered as touch buttons on the display screen 406 of the ATM 402 when the display screen 406 is a touch screen. The cardholder 110 may choose taking the printed receipt by pressing or clicking the YES button 408 and choose not to take the printed receipt by pressing or clicking the NO button 410. When the cardholder 110 chooses not to take the printed receipt of the payment transaction, a flag of the green bit present in a transaction file of the payment transaction is set to the "1" and a green score associated with the user profile of the cardholder 110 is also updated.

Figure 5:
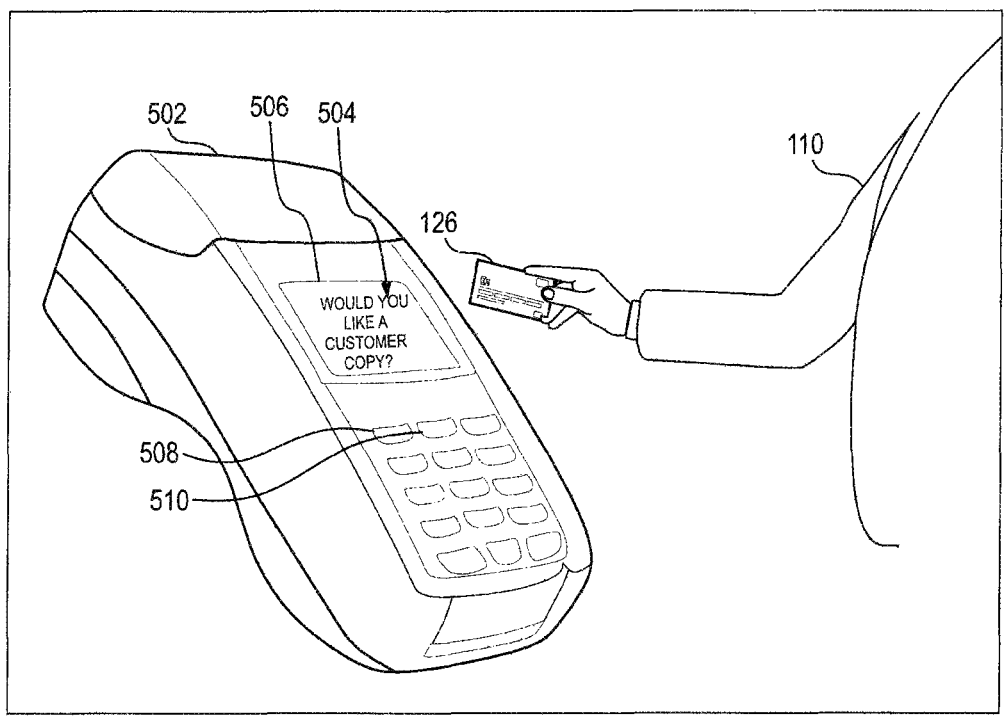
FIG. 5 illustrates an example representation of a UI displayed to the cardholder on a display screen of a POS terminal, in accordance with an embodiment of the present disclosure.

FIG. 5 is an example representation of a user interface (UI) 500 displayed to the cardholder 110 on a display screen 506 of a POS terminal 502 (for example, the POS terminal 104 as shown in FIG. 1) configured to render selection inputs for opting or declining a printed receipt of a payment transaction performed by the cardholder 110 at the POS terminal 104. It shall be noted that the POS terminal 502 may be any POS terminal present at a gas station, a brick or mortar shop, at a vending machine and the like.

As shown in the UI 500, a prompt 504 is rendered on the display screen 506 of the POS terminal 502 which displays a message "would you like a customer copy" and further indicates input buttons (508 and 510) for opting a "YES" or "NO" as response to the prompt. The cardholder 110 may choose taking the customer copy, the agent 124 at the merchant facility 102 presses the button 508 and give the customer copy to the cardholder 110 and if the cardholder 110 chooses not to take the customer copy, the agent 124 presses the button 510. When the cardholder 110 chooses not to take the customer copy of the payment transaction, a flag of the green bit present in a transaction file of the payment transaction is set to "1" and a green score associated with the user profile of the cardholder 110 is also updated.

Figure 6:
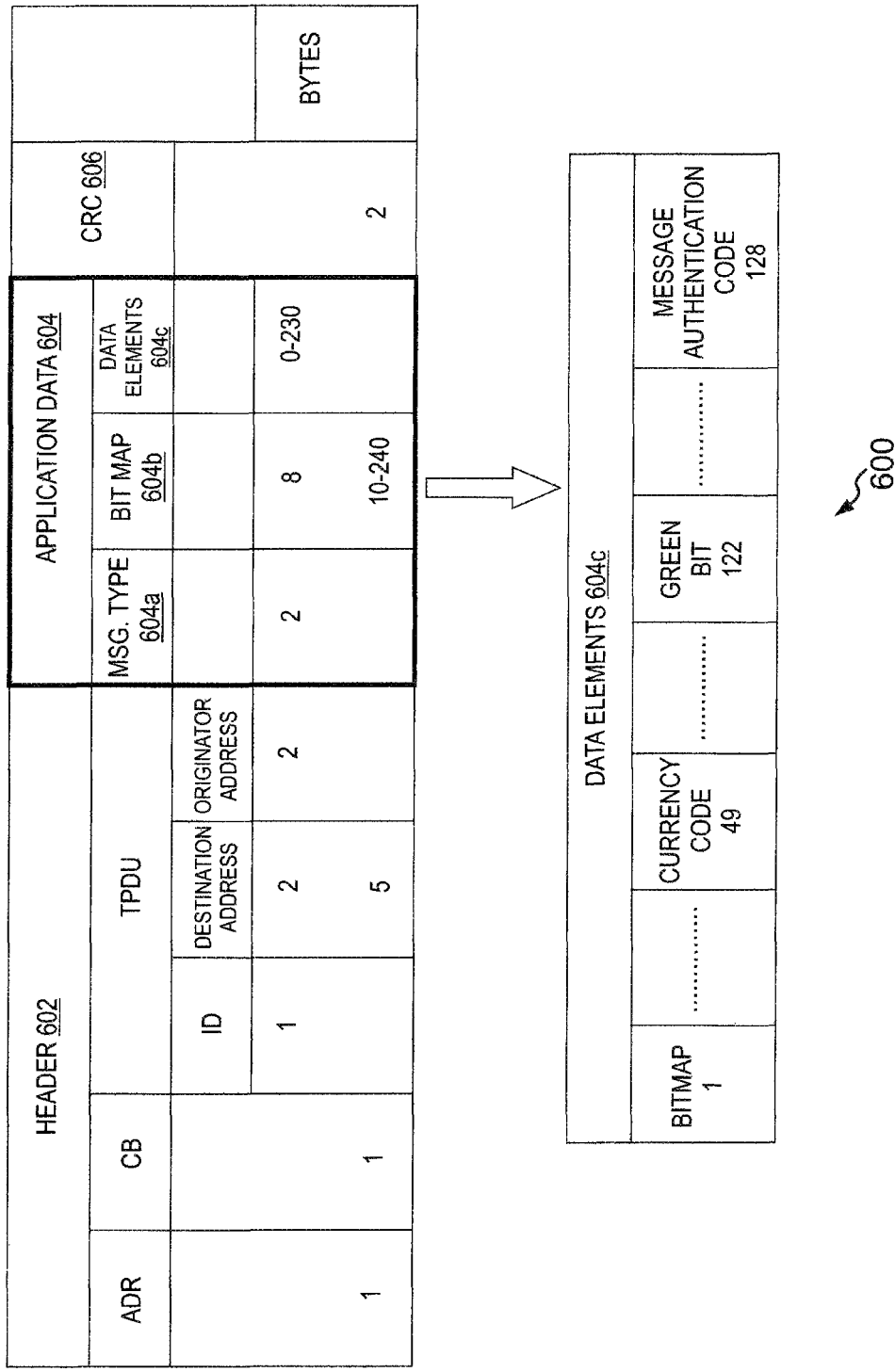
FIG. 6 illustrates an example of format of a transaction file related to the financial transaction, in accordance with an embodiment of the present disclosure.

FIG. 6 illustrates an example of format of the transaction file, in accordance with an example embodiment.

The transaction file comprises, in a non-limiting manner, data fields such as a header data field 602, an application data field 604 and cyclic redundancy check (CRC) data field 606. The application data field 604 includes a data field 604a for information related to message type indicator (MTI) which is a four-digit message which indicates ISO 8583 version, message class, message function and message origin, a data field 604b for information related to bit map which indicates which data elements may be present or not in the message. A message will contain at least one bitmap, called the primary bitmap which indicates which of data elements 1 to 64 are present in the data field 604c. A secondary bitmap may also be present as data element one and indicates which of data elements 65 to 128 are present in the data field 604c. Also, a third bitmap can be used to indicate the presence or absence of fields 129 to 192, and a data field 604c for data elements. The data elements in the data field 604c contain the transaction information. The ISO8583: 1997 contains up to 128 data elements (the message will have up to 2 bitmap fields). The later versions contain up to 192 data elements (the message will have up to 3 bitmaps fields). Each field (data element) has a specific meaning and format such as for general purpose or system related fields or country specific fields.

In an example embodiment of the present disclosure, the data field 604c comprises the green bit as one of the data elements to indicate whether the payment transaction comprises at least one attribute comprising an eco-friendly activity. In an example embodiment, the green bit may be added in the reserved data elements in the data field 604c for example, but not limited to, reserved data field 122 as shown in the FIG. 6. The green bit may be a single bit data field or a multiple bit data field. For the sake of simplicity, the green bit is shown as a single bit data element in the data field 604c. Whenever the payment transaction involves an eco-friendly activity, a flag of the green bit present in a transaction file of the payment transaction is set to "1" otherwise the flag is set to default binary value "0". The other data elements comprise data related to the payment transaction for example, but not limited to, merchant category code, country code, transaction date, a transaction type, a transaction amount, a primary account number, a processing code, acquiring institution country, a point of sale (POS) data, transaction currency code, an approval code, a transaction fee, and a product ID etc. It should also be noted that the sequence of the parameters in the transaction file may vary from what is shown in the FIG. 6.

Figure 7:
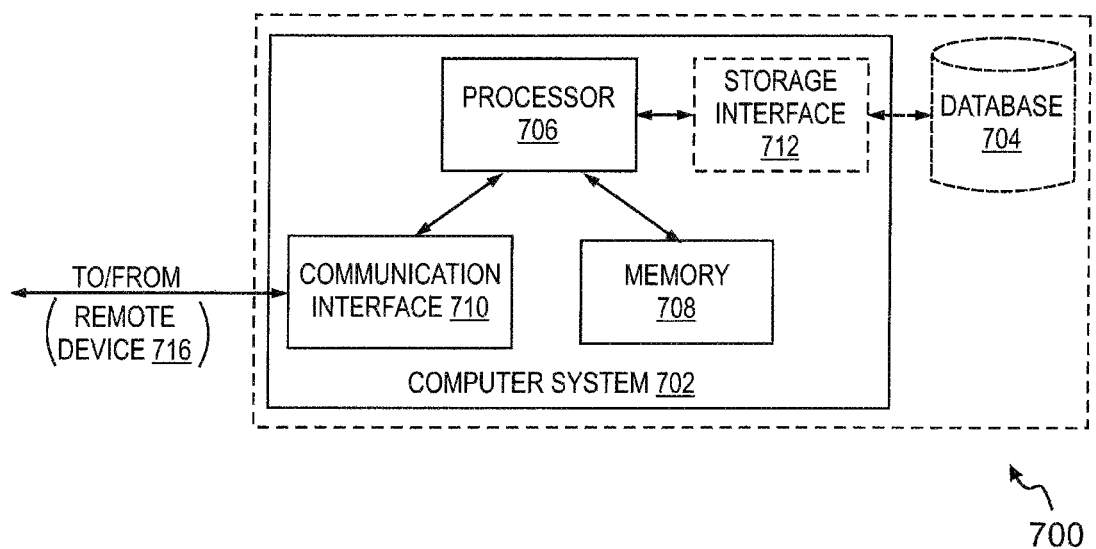
FIG. 7 illustrates a simplified block diagram of a server system for facilitating the green-score reward service to the cardholder, in accordance with an embodiment of the present disclosure.

FIG. 7 is a simplified block diagram of a server system 700 for facilitating a service (e.g., the green-score reward service) to the cardholder 110, in accordance with an embodiment of the present disclosure. Examples of the server system 700 include, but not limited to, the payment server 114 illustrated in FIG. 1. The server system 700 includes a computer system 702 and a database 704.

The computer system 702 includes at least one processor 706 for executing instructions. Instructions may be stored in, for example, but not limited to, a memory 708. The processor 706 may include one or more processing units (e.g., in a multi-core configuration).

The processor 706 is operatively coupled to a communication interface 710 such that the computer system 702 is capable of communicating with a remote device 716 such as a merchant terminal (e.g., the merchant terminal 102), a user device (e.g., the user device 120), an acquiring server (e.g., the acquiring server 116), an issuing server (e.g., the issuing server 118), or communicates with any entity within the network 112. For example, the communication interface 710 may receive a registration request from the user device 120 for registration for a green-score reward service provided by the server system 700. The cardholder 110 can register by accessing a website hosted by the payment server 114. The communication interface 710 may receive a payment transaction request from the merchant terminal 102 for payment of at least a part of a transaction amount of a transaction made the at the merchant terminal 102 by the cardholder 110.

The processor 706 may also be operatively coupled to the database 704. The database 704 is any computer-operated hardware suitable for storing and/or retrieving data, such as, but not limited to, transaction data generated as part of sales activities conducted over the bankcard network including data relating to merchants, account holders or customers, and purchases.

The database 704 may also store information related to a plurality of users' issuer accounts. Each user account data includes at least one of a cardholder name, a cardholder address, an account number, a green score counter, and other account identifier. The database 704 may also store information of a plurality of merchants, a plurality of merchant terminals installed at merchant facilities, such as merchant terminal ID, location of merchant terminals etc. The database 704 may also include instructions for settling transactions including merchant bank account information, determining balance amount to be debited from the issuer account of the cardholder based on transaction amount of transactions. The database 704 may include multiple storage units such as hard disks and/or solid-state disks in a redundant array of inexpensive disks (RAID) configuration. The database 704 may include a storage area network (SAN) and/or a network attached storage (NAS) system. In one embodiment, the communication interface 710 includes a transceiver for wirelessly communicating information to, or receiving information from, the acquiring server 116 or other suitable display device, and/or another type of remote processing device. In another embodiment, the communication interface 710 is capable of facilitating operative communication with the remote devices and a cloud server using Application Program Interface (API) calls. The communication may be achieved over a communication network.

In some embodiments, the database 704 is integrated within the computer system 702. For example, the computer system 702 may include one or more hard disk drives as the database 704. In other embodiments, the database 704 is external to the computer system 702 and may be accessed by the computer system 702 using a storage interface 712. The storage interface 712 is any component capable of providing the processor 706 with access to the database 704. The storage interface 712 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 706 with access to the database 704.

The processor 706 is configured to perform registration of the cardholder 110 for the green-score reward service and process a payment transaction performed by the cardholder 110. The processor 706 is configured to send the payment transaction, via the communication interface 710, to the issuing server 118 for verification. The processor 706 is further configured to determine, post receiving approval from the issuing server 118, whether the payment transaction comprises an eco-friendly activity based on determining whether a flag of a green bit in the transaction file is set to "1", and the processor 706 further updates a green score associated to the user profile based on the flag of the green bit set to "1".

The processor 706 is configured to process the payment transaction of the transaction amount from the issuer account of the cardholder 110 to the acquirer account of the merchant 102. The processor 706 may also be configured to notify the merchant terminal 102 and/or the user device 120 of the transaction status via the communication interface 710.

Figure 8:
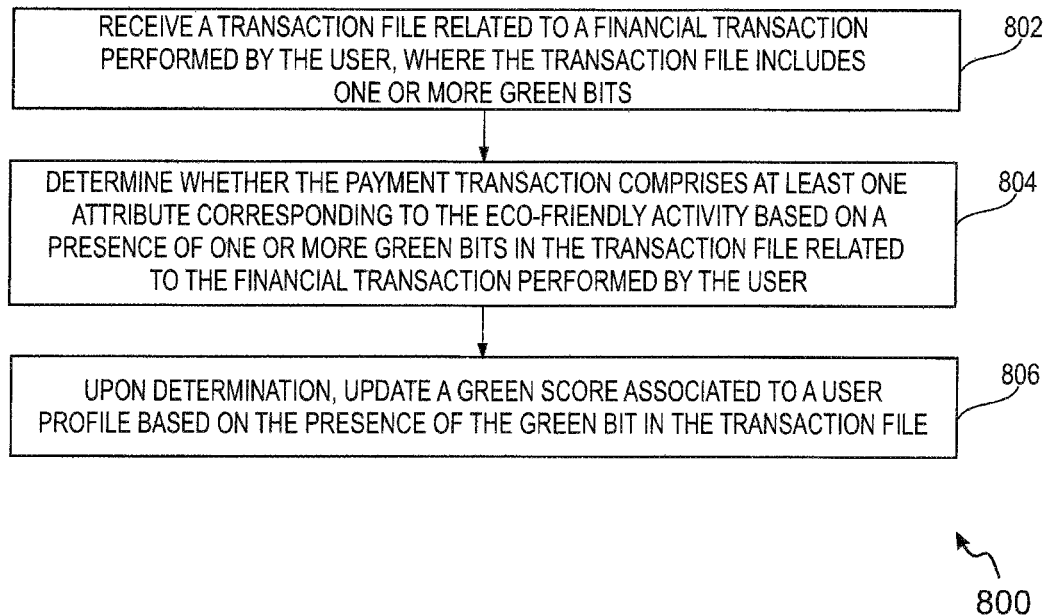
FIG. 8, illustrates a flow diagram representing a method of facilitating tracking an eco-friendly activity performed by the cardholder during a financial transaction, in accordance with an embodiment of the present disclosure.

FIG. 8 illustrates a flow diagram representing a method 800 of facilitating tracking an eco-friendly activity performed by the cardholder 110 during a financial transaction, in accordance with an example embodiment.

At step 802, the method 800 includes receiving a transaction file related to the financial transaction performed by the user who has enrolled for a green-score reward service to encourage an eco-friendly initiative taken by the user 110. The merchant 102 generates a transaction file related to the payment transaction. The transaction file comprises one or more green bits and other data related to the payment transaction such as type of payment, mode of payment, merchant details, type of merchant, message type indicator, etc. In an embodiment, transaction file can be received after a pre-defined time period of completion of the payment transaction. In another embodiment, the transaction file may be a clearance file that is normally send to settle transactions performed by the merchant terminal at pre-determined time intervals. In this embodiment, the green bit is included in the clearance file. In yet another embodiment, the transaction file can be received along with the payment transaction request.

At 804, the method 800 includes determining whether the payment transaction comprises at least one attribute corresponding to the eco-friendly activity based on a presence of one or more green bits in the transaction file related to the financial transaction performed by the user.

At 806, the method 800 includes upon determination, updating a green score associated to a user profile based on the presence of the green bit in the transaction file.

Figure 9:
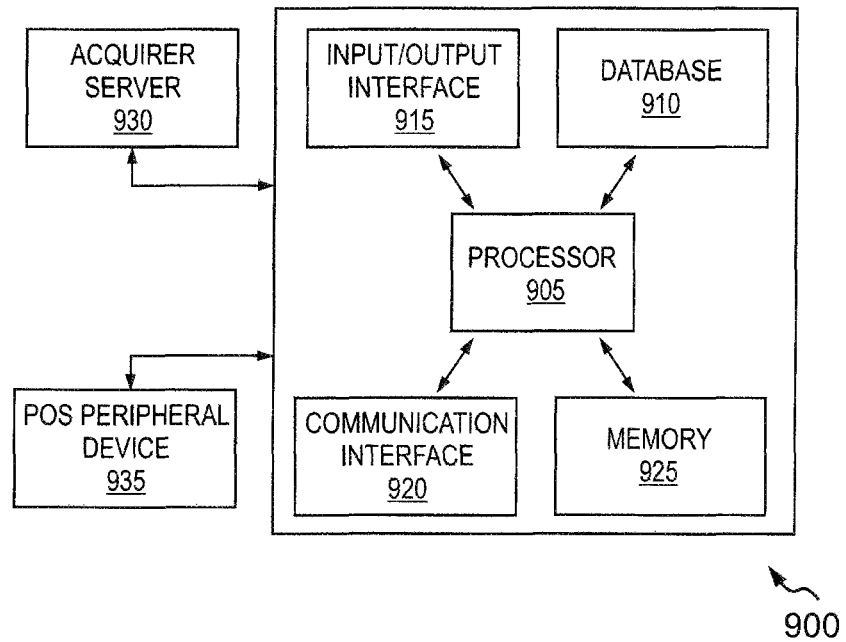
FIG. 9 is a simplified block diagram of a merchant terminal used for financial transactions, in accordance with an example embodiment of the present disclosure.

FIG. 9 illustrates a simplified block diagram of a merchant terminal 900 such as the merchant terminal 102 used for financial transaction, in accordance with one embodiment of the present disclosure. The merchant terminal 900 as explained herein is only one example of the merchant terminal 102. In various embodiments, the merchant terminal 900 can be a merchant mobile phone, a kiosk, a PDA, a merchant facilitated e-commerce website interface running on a computing device, and the like. The merchant terminal 900 includes at least one processor 905 communicably coupled to a database 910, an Input/Output (I/O) interface 915, a communication interface 920 and a memory 925. The components of the merchant terminal 900 provided herein may not be exhaustive, and that the merchant terminal 900 may include more or fewer components than that of depicted in FIG. 9. Further, two or more components may be embodied in one single component, and/or one component may be configured using multiple sub-components to achieve the desired functionalities. Some components of the merchant terminal 900 may be configured using hardware elements, software elements, firmware elements and/or a combination thereof.

An I/O interface 915 is configured to receive inputs from and provide outputs to the end-user (i.e. the merchant and/or the customer) of the merchant terminal 900. For instance, the I/O interface 915 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 925 can be any type of storage accessible to the processor 905. For example, the memory 925 may include volatile or non-volatile memories, or a combination thereof. In some non-limiting examples, the memory 925 can be four to sixty-four MegaBytes (MB) of Dynamic Random Access Memory ("DRAM") or Static Random Access Memory ("SRAM"). In addition, some examples may include supplementary flash memory installed via a PCMCIA slot.

The database 910 is capable of storing and/or retrieving data, such as, but not limited to, smart card insertions, user/customer information, merchant information, payment strings uniquely associated with each user, touch-screen key depressions, keypad key depressions, number of dots printed by the slip and roll printers, check read errors, card swipes, such as, plurality of number pad values of the payment card and the like. Such information can be accessed by the processor 905 using the communication interface 920 to determine potential future failures and the like.

The merchant terminal 900 is capable of communicating with one or more POS peripheral devices such as a POS peripheral device 935 (an example of the ATM 108 of FIG. 1), and external server system such as an acquiring server 930 (an example of the acquiring server 116 of FIG. 1) via the communication interface 920. The POS peripheral device 935 can provide functionality which is used by a consumer at a merchant facility, such as PIN entry, merchant transaction amount entry, clear text entry, signature capture, and the like. Some non-exhaustive examples of the POS peripheral device 935 include POS card reader device, barcode scanner, cash drawer, receipt printer, PIN pad, signature capture device, touchscreen, keyboard, portable data terminal, customer pole display and the like. In some embodiments, the merchant terminal 900 may be mounted near a cash register at a check-out counter in the merchant facility, while the POS peripheral device 935 may be mounted on the check-out counter such that it is accessible to the users. In this way, both the merchant and the user/customer can interact with similar devices to process the payment transaction.

The communication interface 920 is further configured to cause display of user interfaces on the merchant terminal 900. In one embodiment, the communication interface 920 includes a transceiver for wirelessly communicating information to, or receiving information from, the acquiring server 930 or other suitable display device, and/or another type of remote processing device. In another embodiment, the communication interface 920 can facilitate operative communication with the remote devices and a cloud server using Application Program Interface (API) calls. The communication may be achieved over a communication network.

The processor 905 is configured to send the transaction request received from the end-user via the communication interface 920 to the acquiring server 930 for processing the transaction. For example, the processor 905 is configured to receive the payment card information of the cardholder 110, PIN, and the transaction amount via the POS peripheral device 935. The processor 905 can access the database 910 to retrieve the user information and merchant information that are required to be sent along with the transaction request to the acquiring server 930. The processor 905 is configured to set a flag of a green bit in the transaction file to "1" whenever the user 110 performs an eco-friendly activity during the financial transactions or finance related decisions, for example, the processor 905 sets the flag of the green bit to "1" when the user 110 declines the option of taking print out of a customer copy.

Additionally, the merchant terminal 900 can include an operating system and various software applications that can provide various functionality to the merchant terminal 900. For example, in some embodiments, the merchant terminal 900 is addressable with an Internet protocol and includes a browser application. In such embodiments, the processor 905 includes software adapted to support such functionality. In some embodiments, the processor 905 executes software to support network management. In particular, this capacity allows software to be downloaded to a plurality of such systems to provide new applications such as application for enabling payment transactions using POS terminals and/or updates to existing applications. The operating system and software application upgrades are distributed and maintained through communication to the merchant terminal 900 over the communication network.

Figure 10:
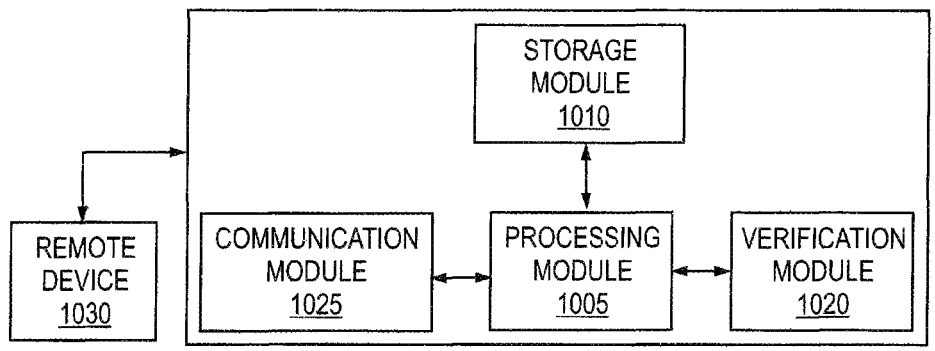
FIG. 10 is a simplified block diagram of an issuing server used for performing payment of at least a part of a transaction amount with a payment card, in accordance with an example embodiment of the present disclosure.

FIG. 10 illustrates a simplified block diagram of an issuing server 1000, in accordance with one embodiment of the present disclosure. The issuing server 1000 is an example of the issuing server 118 of FIG. 1 or may be embodied in the issuing server 118. The issuing server 1000 is associated with an issuer bank/issuer, in which a cardholder 110 may have an account, which provides a payment card. The issuing server 1000 includes a processing module 1005 operatively coupled to a storage module 1010, a verification module 1020 and a communication module 1025. The components of the issuing server 1000 provided herein may not be exhaustive and that the issuing server 1000 may include more or fewer components than that of depicted in FIG. 10. Further, two or more components may be embodied in one single component, and/or one component may be configured using multiple sub-components to achieve the desired functionalities. Some components of the issuing server 1000 may be configured using hardware elements, software elements, firmware elements and/or a combination thereof.

The storage module 1010 is configured to store machine executable instructions to be accessed by the processing module 1005. Additionally, the storage module 1010 stores information related to, contact information of the customer, bank account number, availability of funds in the account, payment card details, and/or the like. This information is retrieved by the processing module 1005.

The processing module 1005 is configured to communicate with one or more remote devices such as a remote device 1030 using the communication module 1025 over a network such as the network 112 of FIG. 1. The examples of the remote device 1030 include the merchant terminal 102, the payment server 114, the acquiring server 116 and the network 112 and the like. The communication module 1025 is capable of facilitating such operative communication with the remote devices and cloud servers using API (Application Program Interface) calls. The communication module 1025 is configured to receive service request for issuing payment cards provided by the issuing server 1000. The communication module 1025 is configured to receive a transaction clearing amount from the payment server 114 via the network 112. In some example embodiments, the processor 1005 is configured to deduct the transaction clearing amount from payment account of the cardholder 110.

The verification module 1020 is configured to verify and validate a customer (such as the cardholder 110), the payment card 126 associated with the cardholder 110 and a PIN of the payment card 126 for approving the transaction. The verification module 1020 may also verify if an issuer account of the customer associated with the payment card 126 have good standing balance. The communication module 1025 is configured to send notification of approval or decline of a transaction to the merchant terminal 102 via the network 112.

Figure 11:
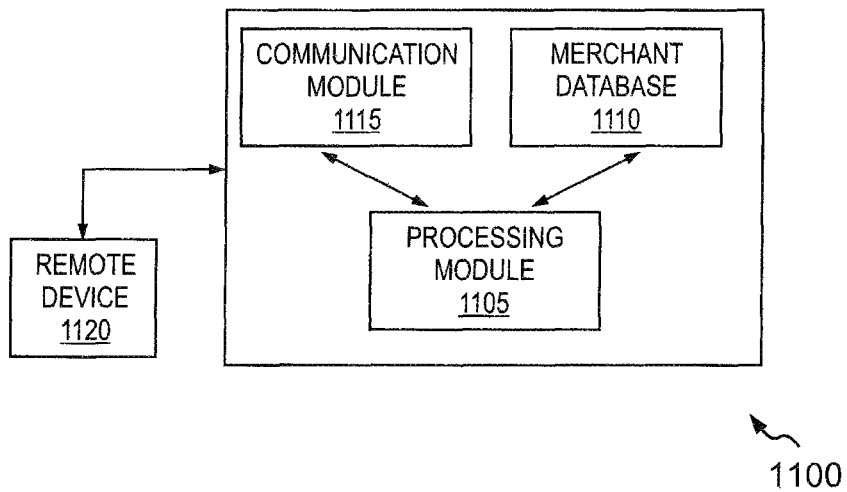
FIG. 11 is a simplified block diagram of an acquiring server used for processing financial transactions at a merchant terminal, in accordance with an example embodiment of the present disclosure.

FIG. 11, illustrates a simplified block diagram of an acquiring server 1100 used for financial transactions, in accordance with one embodiment of the present disclosure. The acquiring server 1100 is associated with an acquirer bank, which may be associated with a merchant (e.g., the merchant facility 102) at whose facility the cardholder 110 is purchasing goods. The merchant may have established an account to accept payment for purchase of goods from customers. The acquiring server 1100 is an example of the acquiring server 116 of FIG. 1 or may be embodied in the acquiring server 116. Further, the acquiring server 1100 is configured to facilitate transaction with the issuing server 1000 using a network, such as the network 112 of FIG. 1. The acquiring server 1100 includes a processing module 1105 communicably coupled to a merchant database 1110 and a communication module 1115. The components of the acquiring server 1100 provided herein may not be exhaustive, and that the acquiring server 1100 may include more or fewer components than that of depicted in FIG. 11. Further, two or more components may be embodied in one single component, and/or one component may be configured using multiple sub-components to achieve the desired functionalities. Some components of the acquiring server 1100 may be configured using hardware elements, software elements, firmware elements and/or a combination thereof.

The merchant database 1110 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 1105 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1105 may be configured to store and update the merchant parameters in the merchant database 1110 for later retrieval. In an embodiment, the communication module 1115 is capable of facilitating operative communication with a remote device 1120.

In some embodiments, the acquiring server 1100 may be configured to communicate with the POS terminal 104 and the ATM 108 using the communication module 1115.

Figure 12:
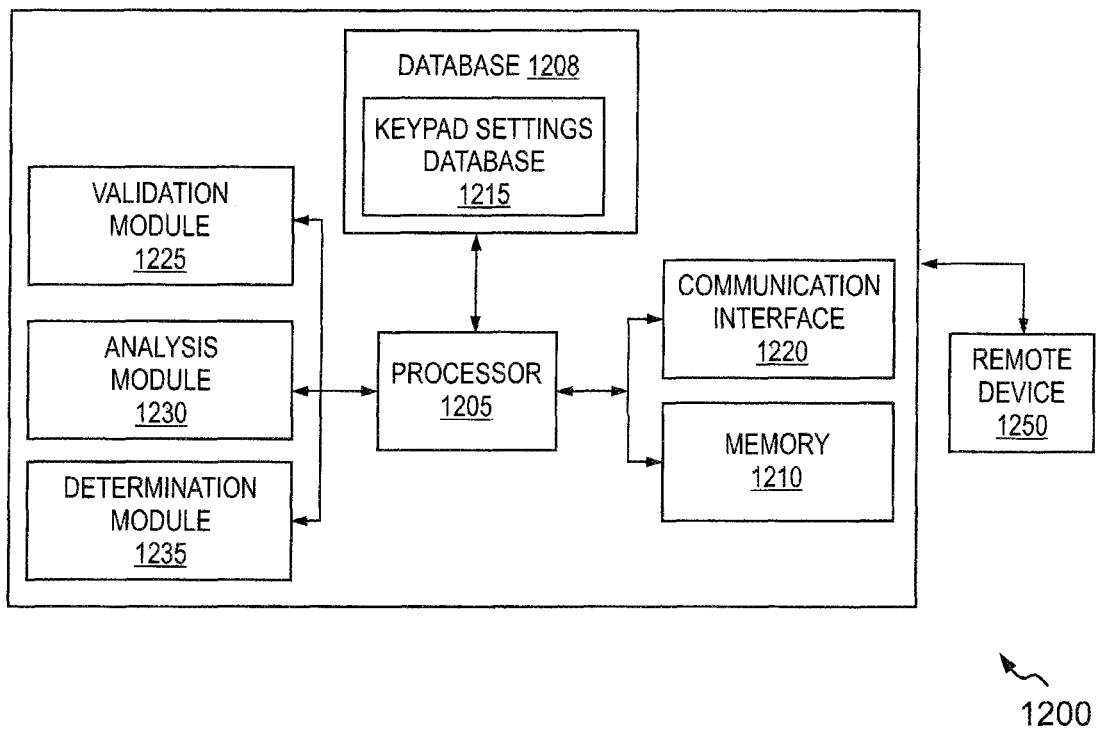
FIG. 12 is a simplified block diagram of a payment server used for providing green-score reward service to the cardholder, in accordance with an example embodiment of the present disclosure.

FIG. 12 is a simplified block diagram of a payment server 1200 used for providing green-score reward service to the cardholder 110 by tracking an eco-friendly activity performed by the cardholder 110 during a financial transaction, in accordance with one embodiment of the present disclosure. The payment server 1200 may correspond to the payment server 114 of FIG. 1. The network 112 or a separate payment network (not shown) may be used by the payment server 1200, the issuing server 1000 and the acquiring server 1100 as a payment interchange network. Examples of payment interchange network include, but not limited to, Mastercard® payment system interchange network. The payment server 1200 includes a processor 1205 configured to extract programming instructions from a memory 1210 to provide various features of the present disclosure. The components of the payment server 1200 provided herein may not be exhaustive and that the payment server 1200 may include more or fewer components than that of depicted in FIG. 12. Further, two or more components may be embodied in one single component, and/or one component may be configured using multiple sub-components to achieve the desired functionalities. Some components of the payment server 1200 may be configured using hardware elements, software elements, firmware elements and/or a combination thereof.

Via a communication interface 1220, the processor 1205 receives a transaction request from a remote device 1250 such as the acquiring server 1100 or the merchant terminal 102. The communication may be achieved through API calls, without loss of generality. A keypad settings database 1215 is embodied in a database 1208 of the payment server 1200. The keypad settings database 1215 stores information corresponding to a customized electronic number pad settings of an electronic number pad from a plurality of customers. The keypad settings database 1215 is in operative communication with a validation module 1225, an analysis module 1230, and a determination module 1235.

The determination module 1235 is configured to receive a plurality of transaction requests associated with a plurality of payment cards 126 via the communication interface 1220. The determination module 1235 is configured to determine whether the transaction is applicable for the green-score reward service and further determines the issuing server (such as the issuing server 118) associated with the payment card 126. In some embodiments, the analysis module 1230 receives the plurality of transaction requests associated with the plurality of card payment transactions done using the payment card 126 using the green-score reward service via the communication interface 1235. The analysis module 1230 is configured to determine whether the payment transaction comprises at least one attribute from a plurality of attributes which comprises an eco-friendly activity. In some embodiments, the processor 1205 may be configured to set a flag of a green bit in a transaction file related to the payment transaction performed by the user 110 when the payment transaction corresponds to an eco-friendly payment transaction. The processor 1205 further updates the green score based on determination that the value of flag of the green bit is set to "1".

The memory 1210 stores details such as Issuer ID, POS ID, country code, acquirer ID, payment card details, acquirer account information, transaction records, merchant account information, and the like. The customer details, the payment card details, the issuer account balance, etc. are validated using the validation module 1225. The validation module 1225 may include one or more predefined rule sets using which the processor 1205 can process the validation. Further, the processor 1205, upon successful validation, sends the transaction amount to the acquiring server 1100.

The processor 1205 is further configured to notify the remote device 1250 of the transaction status via the communication interface 1220. The remote devices, as an example, may be the merchant terminal 102, the merchant interface device 106, the issuing server 118, and the acquiring server 116. In one embodiment, the processor 1205 may facilitate a dedicated software application (also referred to as 'the application interface') capable of being installed on the user device 120. The cardholder 110 may access the application interface for registration and request for the green-score reward service via the user device 120. The cardholder 110 may access the application interface using a web link as well, instead of having a need to install the application on the user device 120.

Without in any way limiting the scope, interpretation, or application of the claims appearing below, a technical effect of one or more of the example embodiments disclosed herein is to provide methods and systems for facilitating tracking of eco-friendly activities performed by a user in finance related actions and, more particularly to, methods and systems for rewarding the user for performing the eco-friendly activities using a green score which is assigned to the user based on tracking the eco-friendly activities performed by the user during finance related actions. The embodiments of the present disclosure facilitate acknowledgment and rewarding of eco-friendly activity performed by the cardholder while performing any transaction or any finance related actions such as opting for e-bill or opting out from taking customer copy, thus these eco-friendly actions of consumers will not go un-noticed and unrecognized due to monitoring or accounting of such finance related activities. Further, the amount of payment transactions logged through green-score reward service can help in accessing the green behavior of the customer and can be used by the following:

Governments can use this data for their pro-environment planning.

Advisory can use this data for brand buildup of a firm providing go green initiative.

Pro-environment groups can use this information for further studies and actions.

Hence, the present disclosure helps in logging and rewarding environment friendly behavior of the user while performing a finance related transactions and decisions.

The disclosed methods with reference to FIGS. 1 to 12, or one or more operations of the flow diagrams 200, 300, and 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems (e.g., the servers 114, 116, and 118) and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:

receiving an enrollment request of a user on a service portal hosted by a first server providing a green-score reward service, the request representing a decision by the user to perform eco-friendly actions;

creating, in a database, a user profile for the user enrolled for the green-score reward service;

based on the enrolling of the user for the green-score reward service, setting a default value of a counter in the database, the counter representing a green score in the user profile created for the user when the user enrolled for the green-score reward service and additions to the green score upon the user performing further eco-friendly actions;

receiving, by the first server from a merchant terminal via a network, a file related to a transaction performed by the user, the file being a clearance file received in a batch for batch processing by the first server at the end of a day, the file comprising a data structure that conforms to ISO:8583 standard and includes a plurality of data elements wherein one or more binary bits are added as reserved data elements in the plurality of data elements, the one or more binary bits tracking at least one eco-friendly user action of a plurality of eco-friendly user actions that the user takes while performing the transaction, and wherein the merchant terminal automatically sets a flag which indicates that the one or more binary bits, that track the eco-friendly actions performed by the user, have been set to one from a default value of zero in the file, a responsive to receiving a confirmation that the at least one eco-friendly user action has been taken by the user, the confirmation of declining a user copy of payment for the transaction being based on the user swiping a payment card a first time and a second time at a device associated with the first server, wherein a status of the one or more binary bits in the received file indicates that the user has opted for at least one of an electronic-bill or an electronic-payment card statement;

determining that the flag in the file has been set;
based on the determination that the flag has been set, concluding that the one or more binary bits are set to one, and based on the conclusion, incrementing, by the first server, the counter by a predetermined number;
based on determining that a value of the counter is greater than zero, identifying the eco-friendly user actions that have environmental benefit; and
rewarding the user for the eco-friendly user actions.

2. The method as claimed in claim 1, wherein the default value in the counter in the database is set to ten.

3. The method as claimed in claim 1, further comprising:
sending the file to an issuing server associated with a payment account of the user, wherein the payment account is used for a financial transaction; and
receiving a confirmation of the financial transaction from the issuing server, wherein the green score is updated upon receipt of the confirmation.

4. The method as claimed in claim 1, wherein updating the green score comprises:
incrementing the green score by a predetermined number upon the determination;
resetting the green score to a default score based on a time cycle; and
rewarding the user based on the green score.

5. The method as claimed in claim 1, wherein the status of the one or more binary bits in the received file indicates that the user has declined one or more of the following of:
a request for taking print of a transaction receipt during a financial transaction at an automated teller machine (ATM) terminal; and
a request for taking print of a customer copy during the financial transaction at a point of sale (POS) terminal.

6. The method as claimed in claim 1, wherein a status of the one or more binary bits in the received file indicates one or more of the following:
a decrease in an electricity bill amount paid by the user consecutively for a threshold number of months; and
a decrease in a fuel consumption of the user consecutively for a threshold number of months.

7. The method as claimed in claim 1, wherein the status of the one or more binary bits in the received file indicates that the user has purchased an eco-friendly product through e-commerce.

8. A server system comprising:
a memory configured to store instructions; and
a processor configured to execute the instructions stored in the memory, the execution causing the server system to perform operations to:
receive an enrollment request of a user on a service portal hosted by the server system, providing a green-score reward service, the request representing a decision by the user to perform eco-friendly actions;
create, in a database, a user profile for the user enrolled for the green-score reward service;
based on the enrolling of the user for the green-score reward service, set a default value of a counter in the database, the counter representing a green score in the user profile created for the user when the user enrolled for the green-score reward service and additions to the green score upon the user performing further eco-friendly actions;
receive, by the server system, from a merchant terminal via a network, a file related to a transaction performed by the user, the file being a clearance file received in a batch for batch processing by the server system at the end of a day, the file comprising a data structure that conforms to an ISO:8583 standard and includes a plurality of data elements wherein one or more binary bits are added as reserved data elements in the plurality of data elements, the one or more binary bits tracking at least one eco-friendly user action of a plurality of eco-friendly user actions that is taken by the user while performing the transaction, and wherein the merchant terminal automatically sets a flag which indicates that the one or more binary bits, that track the eco-friendly actions performed by the user, have been set to one from a default value of zero in the file, responsive to receiving a confirmation of the at least one eco-friendly user action taken by the user, the confirmation of declining a user copy of payment for the transaction being based on the user swiping a payment card a first time and a second time at a device associated with the server system, wherein a status of the one or more binary bits in the received file indicates that the user has opted for at least one of an electronic-bill or an electronic-payment card statement;
determine that the flag in the file has been set;
based on the determination that the flag has been set, conclude that the one or more binary bits are set to one, and based on the conclusion, increment, by the server system, the counter by a predetermined number;
based on determining that a value of the counter is greater than zero, identify the eco-friendly user actions that have environmental benefit; and
reward the user for the eco-friendly user actions.

9. The server system as claimed in claim 8, wherein the processor is further configured to cause the server system to perform at least in part to:
send the file to an issuing server associated with a payment account of the user, wherein the payment account is used for a financial transaction; and
receive a confirmation of the financial transaction from the issuing server, wherein the green score is updated upon receipt of the confirmation.

10. The server system as claimed in claim 8, wherein the processor is further configured to perform at least in part to:
increment the green score by a predetermined score upon the determination;
reset the green score to a default score based on a time cycle; and
reward the user based on the green score.

11. The server system as claimed in claim 8, wherein the merchant terminal is configured to automatically set the one or more binary bits upon the user performing a pre-defined gesture to confirm the performing of the at least one eco-friendly user action.

12. The server system as claimed in claim 8, wherein a status of the one or more binary bits in the received file indicates that the user has declined a request for taking print of a customer copy during a financial transaction at a point of sale (POS) terminal.

13. The server system as claimed in claim 8, wherein a status of the one or more binary bits in the received file indicates one or more of the following:
a decrease in an electricity bill amount paid by the user consecutively for a threshold number of months; and
a decrease in a fuel consumption of the user consecutively for a threshold number of months.

14. A non-transitory computer-readable storage medium having computer-executable instructions embodied thereon, wherein, upon execution by at least one processor, the computer-executable instructions cause the processor to perform operations comprising:
- receiving an enrollment request of a user on a service portal hosted by a first server providing a green-score reward service, the request representing a decision by the user to perform eco-friendly actions;
- creating, in a database, a user profile for the user enrolled for the green-score reward service;
- based on the enrolling of the user for the green-score reward service, setting a default value of a counter in the database, the counter representing a green score in the user profile created for the user when the user enrolled for the green-score reward service and additions to the green score upon the user performing further eco-friendly actions;
- receiving, by the first server from a merchant terminal via a network, a file related to a transaction performed by the user, the file being a clearance file received in a batch for batch processing by the first server at the end of a day, the file comprising a data structure that conforms to an ISO:8583 standard and includes a plurality of data elements wherein one or more binary bits are added as reserved data elements in the plurality of data elements, the one or more binary bits tracking at least one eco-friendly user action of a plurality of eco-friendly user actions that are taken by the user while performing the transaction, and wherein the merchant terminal automatically sets a flag which indicates that the one or more binary bits, that track the eco-friendly actions performed by the user, have been set to one from a default value of zero in the file, responsive to receiving a confirmation of the at least one eco-friendly user action taken by the user, the confirmation of declining a user copy of payment for the transaction being based on the user swiping a payment card a first time and a second time at a device associated with the first server, wherein a status of the one or more binary bits in the received file indicates that the user has opted for at least one of an electronic-bill or an electronic-payment card statement;
- determining that the flag in the file has been set;
- based on the determining that the flag has been set, concluding that the one or more binary bits are set to one, and based on the conclusion, incrementing, by the first server, the counter by a predetermined number;
- based on determining that a value of the counter is greater than zero, identifying the eco-friendly user actions that have environmental benefit; and
- rewarding the user for the eco-friendly user actions.

15. The non-transitory computer-readable storage medium of claim 14, wherein the at least one eco-friendly user action comprises at least one of:
- a declination of a request for taking print of a transaction receipt during a financial transaction at an automated teller machine (ATM) terminal; and
- a declination of a request for taking print of a customer copy during the financial transaction at a point of sale (POS) terminal.

16. The non-transitory computer-readable storage medium of claim 14, wherein the at least one eco-friendly user action comprises one or more of:
- a decrease in an electricity bill amount paid by the user consecutively for a threshold number of months; and
- a decrease in a fuel consumption of the user consecutively for a threshold number of months.

17. The non-transitory computer-readable storage medium of claim 14, wherein the first server is configured to automatically set the one or more binary bits upon the user performing a pre-defined gesture to confirm the performing of the at least one eco-friendly user action.

18. The server system of claim 8, further comprising a validation module, an analysis module, and a determination module executing the instructions stored in the memory to cause the server system to perform the operations.

* * * * *